(12) United States Patent
Hildebrand

(10) Patent No.: US 12,118,366 B2
(45) Date of Patent: Oct. 15, 2024

(54) METHOD, COMPUTER PROGRAM AND APPARATUS FOR PERFORMING A BOOT PROCESS FOR A SYSTEM

(71) Applicant: Elektrobit Automotive GmbH, Erlangen (DE)

(72) Inventor: Uwe Hildebrand, Fürth (DE)

(73) Assignee: Elektrobit Automotive GmbH, Erlangen (DE)

( * ) Notice: Subject to any disclaimer, the term of this patent is extended or adjusted under 35 U.S.C. 154(b) by 109 days.

(21) Appl. No.: 17/717,655

(22) Filed: Apr. 11, 2022

(65) Prior Publication Data
US 2022/0326961 A1    Oct. 13, 2022

(30) Foreign Application Priority Data

Apr. 12, 2021 (EP) .................................. 21167823

(51) Int. Cl.
*G06F 9/44* (2018.01)
*G06F 9/4401* (2018.01)

(52) U.S. Cl.
CPC .......... *G06F 9/4408* (2013.01); *G06F 9/4403* (2013.01); *G06F 9/4418* (2013.01)

(58) Field of Classification Search
None
See application file for complete search history.

(56) References Cited

U.S. PATENT DOCUMENTS

| 7,089,547 | B2 | 8/2006 | Goodman et al. |
| 7,487,343 | B1 | 2/2009 | Insley et al. |
| 8,694,824 | B2 | 4/2014 | Howard et al. |
| 2013/0031538 | A1* | 1/2013 | Skalsky ............... G06F 9/4418 717/168 |
| 2013/0047031 | A1 | 2/2013 | Tabone et al. |
| 2015/0012738 | A1 | 1/2015 | Shah et al. |
| 2016/0350166 | A1* | 12/2016 | Andrews ................. G06F 11/22 |
| 2022/0284104 | A1* | 9/2022 | Herberholz ........... G06F 21/575 |

OTHER PUBLICATIONS

Search Report dated Sep. 27, 2021 from corresponding European patent application No. 21167823.0.
EP Examination search report dated Feb. 28, 2024 of the counterpart EP application No. 21167823.0.

* cited by examiner

*Primary Examiner* — Fahmida Rahman

(57) ABSTRACT

The present invention relates to a method, to a computer program containing instructions and to an apparatus for performing a boot process for a system that supports redundant copies of boot images. In a first step, an active copy of the boot images is determined (S1). Then the active copy of the boot images is processed (S2). In response to a successful boot process, another copy of the boot images is then set (S3) as the active copy for a subsequent boot process.

13 Claims, 6 Drawing Sheets

METHOD, COMPUTER PROGRAM AND APPARATUS FOR PERFORMING A BOOT PROCESS FOR A SYSTEM

BACKGROUND

The present invention relates to a method, to a computer program containing instructions and to an apparatus for performing a boot process for a system that supports redundant copies of boot images.

A startup or boot process, also known as booting, refers to the loading of an operating system of a computer system, as routinely required after switch-on. During the system startup, contents of a boot image are unpacked and loaded. The loaded contents initialize all the further steps, which ultimately lead to the launch of the actual operating system.

An increasing number of systems support the use of redundant boot images. When there are redundant boot images, usually two copies of a boot image are stored on two partitions, an A-partition and a B-partition. A global flag is used to declare one of the partitions as the active partition. The boot image stored on this partition is then retrieved during the boot process. The other partition is often referred to as the inactive partition or the mirror partition.

Two independent partitions are not necessarily needed to implement the described approach. The de facto essential requirement is for at least two copies of each boot image to be present. It is quite possible for these two copies of a boot image to be located in the same partition.

The use of redundant copies of boot images is a useful approach to performing updates in the background that are activated at the next restart. While the system runs using an active copy of a boot image, the other, non-active, copy of the boot image is updated. After the update, the global flag is used to declare the updated copy of the boot image as the active copy. When subsequently restarted, the system is launched using the updated copy of the boot image. A corresponding procedure can be followed when two or more boot images are used in a multi-stage boot sequence.

One advantage of such an implementation is that a corrupted active copy of a boot image is implicitly identified during execution of the boot sequence, for instance by a signature check. A repair can then be initiated. Identifying a corrupted non-active copy of the boot image requires an explicit check, however, because, in the event of no errors, the non-active copies are not needed during a boot process.

US 2013/0047031 A1 describes a method for recovering a boot image from a secure location. Hardware instructions initiate a sequence of boot cycles to launch a computer operating system. During the boot cycles, multiple levels of boot code are verified and a determination is made whether each level is usable by the device. If a level of boot code is determined to be unusable, a secure copy of the boot code is loaded from a secure read-only location to repair the unusable code to launch the computer operating system.

An object of the present invention is to provide improved solutions for performing a boot process for a system.

BRIEF SUMMARY

This object is achieved by a method having the features of claim 1, by a computer program containing instructions having the features of claim 9 and by an apparatus having the features of claim 10. The dependent claims relate to preferred configurations of the invention.

According to a first aspect of the invention, a method for performing a boot process for a system that supports redundant copies of boot images comprises the steps:
 determining an active copy of the boot images;
 processing the active copy of the boot images; and
 setting another copy of the boot images as the active copy for a subsequent boot process in response to a successful boot process.

According to a further aspect of the invention, a computer program comprises instructions that, when they are executed by a computer, cause the computer to execute the following steps for performing a boot process for a system that supports redundant copies of boot images:
 determining an active copy of the boot images;
 processing the active copy of the boot images; and
 setting another copy of the boot images as the active copy for a subsequent boot process in response to a successful boot process.

The term computer is intended to be understood in broad terms. In particular, it also encompasses control modules, embedded systems and other processor-based data processing devices.

The computer program can be provided for electronic retrieval or may be stored on a computer-readable storage medium, for example.

According to a further aspect of the invention, an apparatus for performing a boot process for a system that supports redundant copies of boot images comprises:
 an analysis unit for determining an active copy of the boot images; and
 a processing unit for processing the active copy of the boot images and for setting another copy of the boot images as the active copy for a subsequent boot process in response to a successful boot process.

In the solution according to the invention, after every boot process, or at least after a defined number of boot processes, another copy of a boot image is set as the active copy for the next boot process. All the copies of the boot images are thereby implicitly checked regularly. The solution according to the invention does not need a special implementation or additional hardware. Nor does it have any impact on the performance of a processor of the system at runtime.

According to one aspect of the invention, at least one flag is used to indicate the active copy of the boot images. The use of flags is a simple way of communicating for a pending boot process, which copy of the boot images is the active copy and is meant to be processed.

According to one aspect of the invention, the at least one flag is stored in a memory of the system or is provided by an external unit. Storing in the system has the advantage that the boot process can be executed fully autonomously without external input. On the other hand, an external unit providing flags allows a higher-level supervisor instance to influence the boot process.

According to one aspect of the invention, the at least one flag is set for individual stages of a boot sequence or globally for the boot sequence. Usually a global flag is set for a boot sequence, which then applies to all the stages of the boot sequence. It is equally possible, however, to use dedicated flags for individual stages or even all the stages.

According to one aspect of the invention, in response to ascertaining corruption of an active copy of a boot image, a corresponding redundant copy of the affected boot image is processed. This ensures that the boot process can be brought to a successful conclusion despite corruption of a boot image.

According to one aspect of the invention, after the processing of the redundant copy of the boot image, the corrupted active copy of the boot image is repaired. Later boot processes can thereby be carried out again with access to the now-repaired copy of the boot image. In addition, an uncorrupted copy is hence available again should the redundant copy become corrupted.

According to one aspect of the invention, redundant copies of the boot images are available only for individual stages of a boot sequence. The solution according to the invention can be used also for systems that do not provide redundant boot images for every stage of a boot sequence. In this case, for the stages without redundancy, simply the one available copy of a boot image is always used in the boot sequence, irrespective of which boot images are otherwise labeled as active. A corrupted non-redundant boot image is then identified anyway in every boot process, and must be repaired by suitable mechanisms.

According to one aspect of the invention, in response to an update process for a loadable software component or a loadable firmware component, the method is suspended until successful completion of the update process. In the case of an update process, the labeling of the active copy of a boot image is the sole responsibility of a control application for the update process. This prevents the two processes from interfering with each other.

A method according to the invention or an apparatus according to the invention is preferably used in a means of transport, for instance in a motor vehicle. The means of transport may also be, however, a manned or unmanned aircraft, for instance a drone or a flying taxi, etc. In general, however, the use of the solution according to the invention is advantageous for all (embedded) systems that support redundant copies of boot images.

Further features of the present invention will become apparent from the following description and the accompanying claims in conjunction with the figures.

DETAILED DESCRIPTION

For a better understanding of the principles of the present invention, embodiments of the invention will be explained in more detail below with reference to the figures. The same reference signs will be used in the figures for identical or functionally identical elements and are not necessarily described again for each figure. It is to be understood that the invention is not restricted to the illustrated embodiments and that the features described can also be combined or modified without departing from the scope of protection of the invention as defined in the appended claims.

Figure 1:
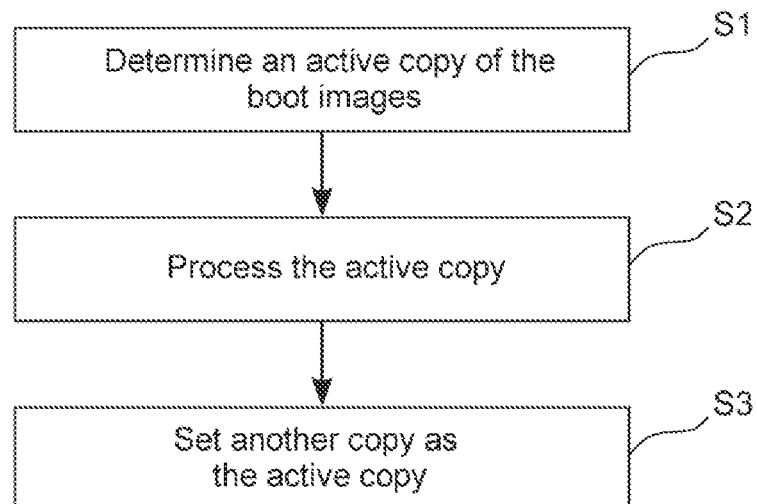
FIG. 1 shows schematically a method for performing a boot process for a system.

FIG. 1 shows schematically a method for performing a boot process for a system that supports redundant copies of boot images. In this case, redundant copies of the boot images may be available for all the stages or only for individual stages of a boot sequence. In a first step, an active copy of the boot images is determined S1. This can be indicated, for example, by at least one flag. The at least one flag may be stored, for example, in a memory of the system, or can be provided by an external unit, and may be set for individual stages of the boot sequence or globally for the boot sequence. Then the active copy of the boot images is processed S2. In response to a successful boot process, another copy of the boot images is then set S3 as the active copy for a subsequent boot process. If corruption of an active copy of a boot image is ascertained during the boot process, then preferably a corresponding redundant copy of the affected boot image is processed. After the processing of the redundant copy, the corrupted active copy of the boot image can then be repaired. In response to an update process for a loadable software component or a loadable firmware component, the method is preferably suspended until successful completion of the update process.

Figure 2:
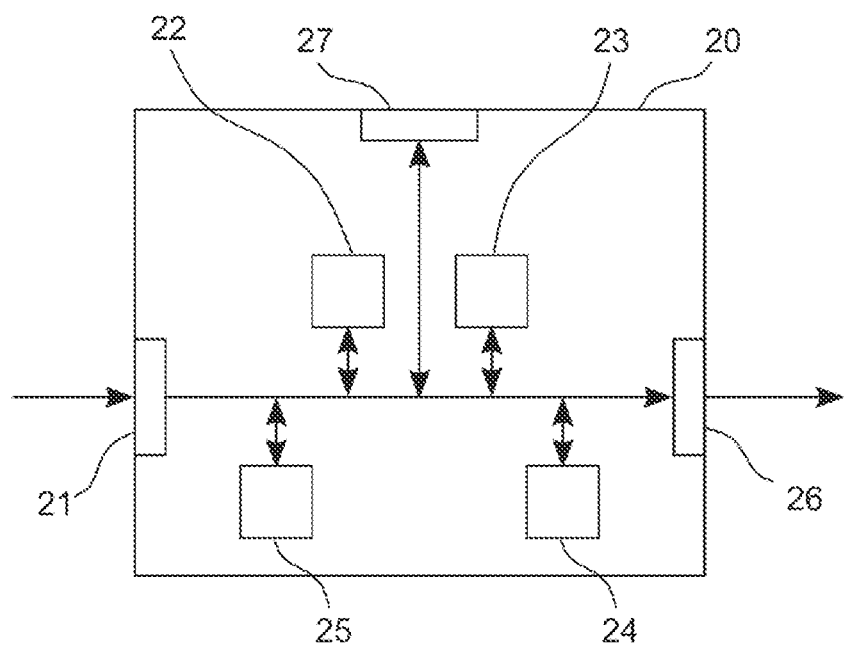
FIG. 2 shows schematically a first embodiment of an apparatus for performing a boot process for a system.

FIG. 2 shows a simplified schematic diagram of a first embodiment of an apparatus 20 for performing a boot process for a system that supports redundant copies of boot images. In this case, redundant copies of the boot images may be available for all the stages or only for individual stages of a boot sequence. The apparatus 20 has an input 21, via which can be received, for example, updated software components or firmware components or data provided by an external unit. An analysis unit 22 is designed to determine an active copy of the boot images. This can be indicated, for example, by at least one flag. The at least one flag may be stored, for example, in a memory of the system, or can be provided by an external unit, and may be set for individual stages of the boot sequence or globally for the boot sequence. A processing unit 23 is designed to process the active copy of the boot images. This usually includes checking the boot image of the currently next stage of the boot sequence, for instance using a signature check to establish its validity. The processing unit 23 is also designed to set, in response to a successful boot process, another copy of the boot images as the active copy for a subsequent boot process. In the case of externally provided flag(s), this would also be performed by a higher-level external supervisor instance. Data for further use can be output via an output 26 of the apparatus 20. If corruption of an active copy of a boot image is ascertained by the processing unit 23 during the boot process, then preferably a corresponding redundant copy of the affected boot image is processed. After the processing of the redundant copy, the corrupted active copy of the boot image can then be repaired. In response to an update process for a loadable software component or a loadable firmware component, the method is preferably suspended until successful completion of the update process.

The analysis unit 22 and the processing unit 23 can be controlled by a control unit 24. Settings for the analysis unit 22, the processing unit 23 or the control unit 24 can be altered, if applicable, via a user interface 27. The data that accrues in the apparatus 20 can be stored in a memory 25 of the apparatus 20 if necessary, for example for later analysis or for use by the components of the apparatus 20. The analysis unit 22, the processing unit 23 and the control unit 24 can be implemented as dedicated hardware, for example as integrated circuits. However, they can of course also be implemented partly or fully in combination or as software that runs on a suitable processor, for example on a GPU or a CPU. The input 21 and the output 26 can be implemented as separate interfaces or as a combined interface.

Figure 3:
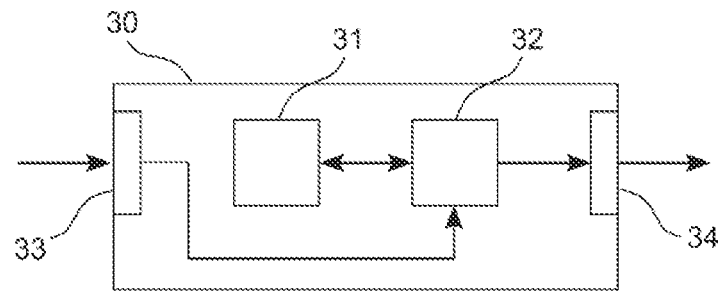
FIG. 3 shows schematically a second embodiment of an apparatus for performing a boot process for a system.

FIG. 3 shows a simplified schematic diagram of a second embodiment of an apparatus 30 for performing a boot process for a system that supports redundant copies of boot images. The apparatus 30 has a processor 32 and a memory 31. For example, the apparatus 30 is a control module. Stored in the memory 31 are instructions which, when executed by the processor 32, cause the apparatus 30 to perform the steps according to one of the methods described. The instructions stored in the memory 31 thus embody a program which is executable by the processor 32 and which realizes the method according to the invention. The apparatus 30 has an input 33 for receiving information from a component of a control system. Data generated by the processor 32 is provided via an output 34. Furthermore, said data can be stored in the memory 31. The input 33 and the output 34 can be combined to form a bidirectional interface.

The processor 32 can comprise one or more processor units, for example microprocessors, digital signal processors or combinations thereof.

The memories 25, 31 of the described apparatuses may contain both volatile and nonvolatile memory areas and may comprise a wide variety of storage devices and storage media, for example hard disks, optical storage media or semiconductor memories.

Figure 4:
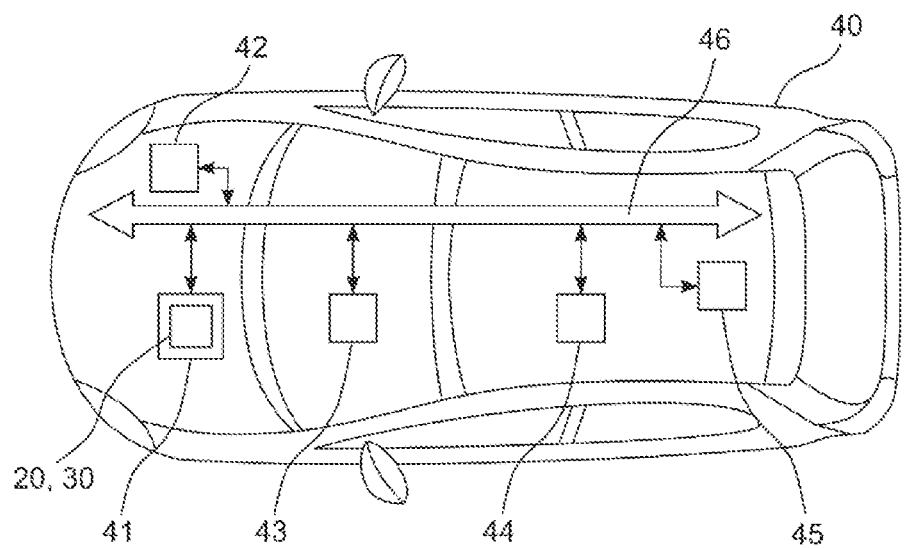
FIG. 4 shows schematically a means of transport in which a solution according to the invention is implemented.

FIG. 4 shows schematically a means of transport 40 in which a solution according to the invention is implemented. The means of transport 40 is a motor vehicle in this example. The motor vehicle comprises at least one computer unit 41 that supports redundant copies of boot images. The computer unit 41 comprises an apparatus 20, 30 according to the invention for performing a boot process. The motor vehicle also comprises at least one assistance system 42, which assists an operator of the motor vehicle during driving. In this example, further elements of the motor vehicle are a navigation system 43 and a data transfer unit 44. A connection to a back-end, for instance for receiving updated software for the computer unit 41 or other components of the motor vehicle, can be established by means of the data transfer unit 44. A memory 45 is present for storing data. Alternatively, this may also be present locally at the various units 41-44 in distributed form. Data is exchanged between the various components of the motor vehicle via a network 46.

Figure 5:
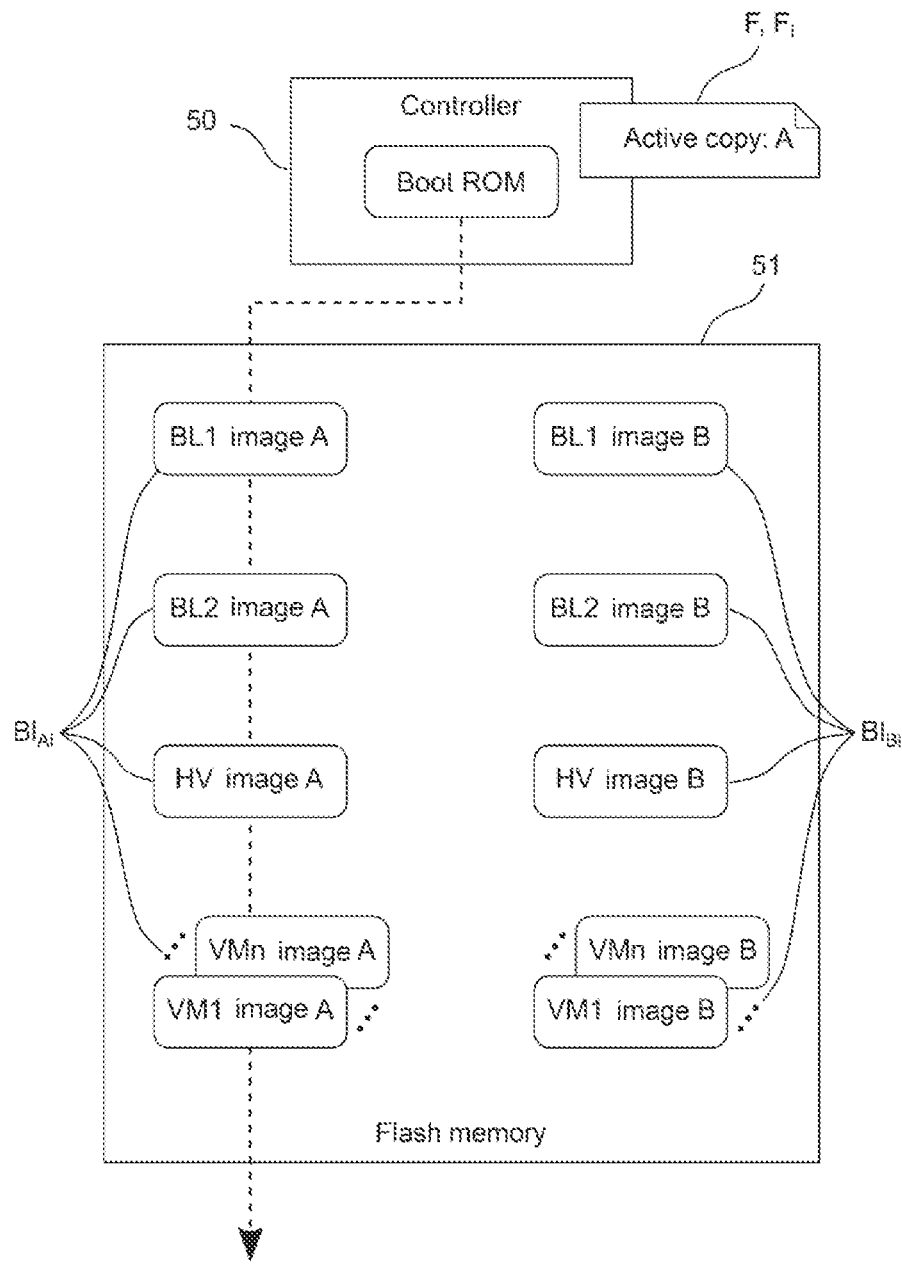
FIG. 5 shows schematically a multi-stage boot sequence according to the prior art when no corrupted boot image is present.

FIG. 5 shows schematically a multi-stage boot sequence according to the prior art when a corrupted boot image is not present. In the example shown, the system supports redundant copies of boot images $BI_{Ai}$, $BI_{Bi}$ for all the stages of the boot sequence. In addition, a global flag F is used, by means of which the same active copy (copy A or B) is selected for all the stages. It is also possible to use individual flags $F_i$ for individual stages or all the stages. In this example, the stages comprise two bootloader stages (BL1 and BL2), a hypervisor stage (HV) and a series of stages of virtual machines (VM1 to VMn). Two copies of the boot images $BI_{Ai}$, $BI_{Bi}$ are stored in a flash memory 51 for all the stages of the boot sequence. The active copy that is meant to be used for the multi-stage boot sequence is defined by setting the global flag. In FIG. 5, copy A is selected as the active copy and accordingly retrieved by a controller 50. In each stage of the boot sequence, the boot image $BI_{Ai}$, $BI_{Bi}$ of the next stage is read from the flash memory 51 and, in the case of a secure boot, validated. Therefore the boot code of each stage can identify a corrupted active copy of the boot image $BI_{Ai}$, $BI_{Bi}$ of the next stage, for instance from information about read errors during access to the flash memory 51, or from a failed validation of the boot image $BI_{Ai}$, $BI_{Bi}$. In FIG. 5, none of the boot images $BI_{Ai}$, $BI_{Bi}$ is corrupted, and therefore the boot sequence can be executed without accessing the redundant copies of the images $BI_{Ai}$, $BI_{Bi}$.

Figure 6:
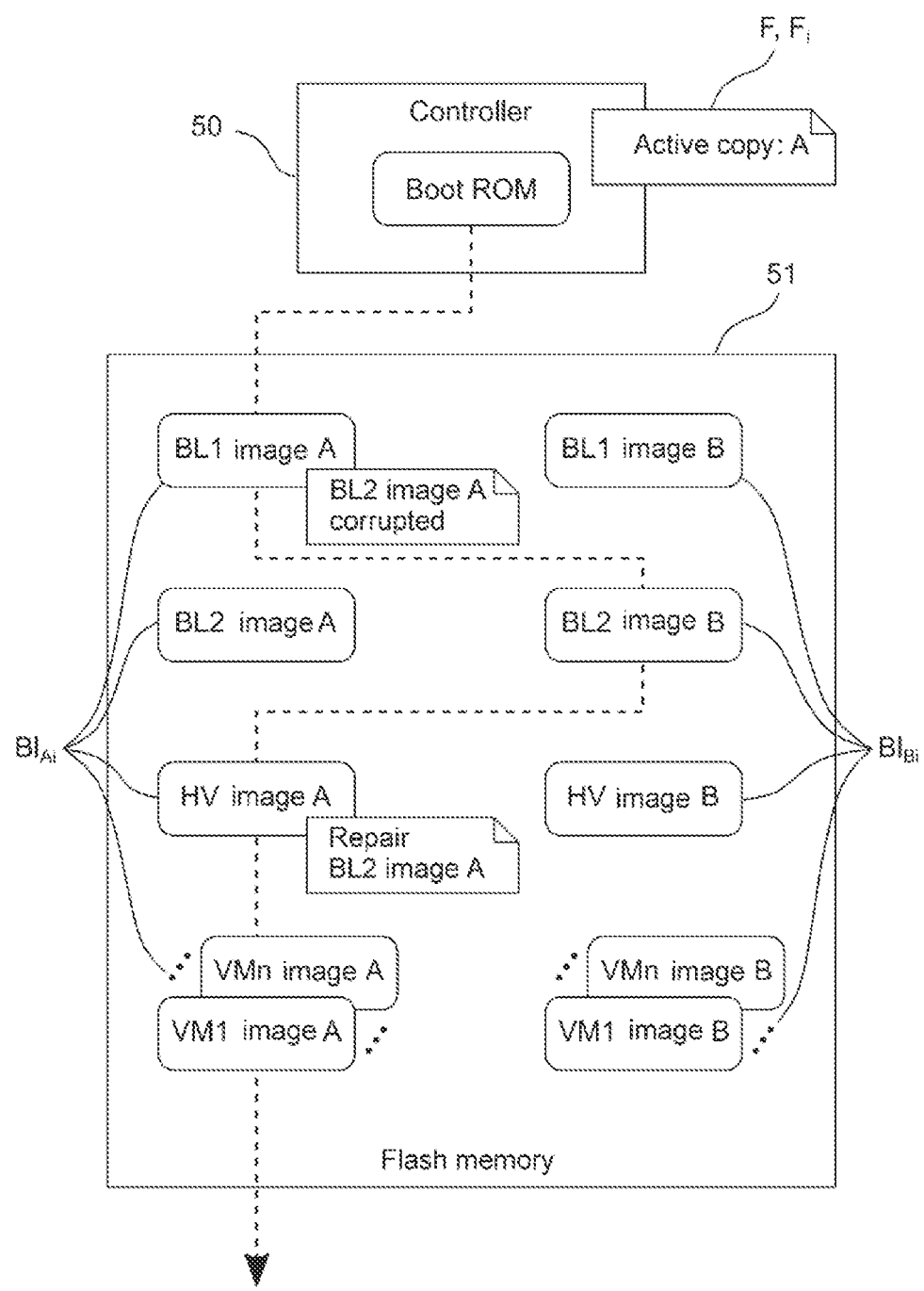
FIG. 6 shows schematically a multi-stage boot sequence according to the prior art when a corrupted boot image is present.

FIG. 6 shows schematically the multi-stage boot sequence from FIG. 5 for the case when a corrupted boot image $BI_{Ai}$, $BI_{Bi}$ is present. In the example shown, the copy A of the boot image $BI_{Ai}$ of the second bootloader stage is corrupt. The boot code of the first bootloader stage identifies this corruption, with the result that instead of copy A, copy B of the boot image $BI_{Bi}$ of the second bootloader stage is accessed. Access then returns to copy A for the subsequent stages. In the example shown, the hypervisor stage carries out a repair to the boot image $BI_{Ai}$ of the second bootloader stage by replacing the corrupted copy A of the boot image $BI_{Ai}$ with the intact copy B of the boot image $BI_{Bi}$.

Figure 7:
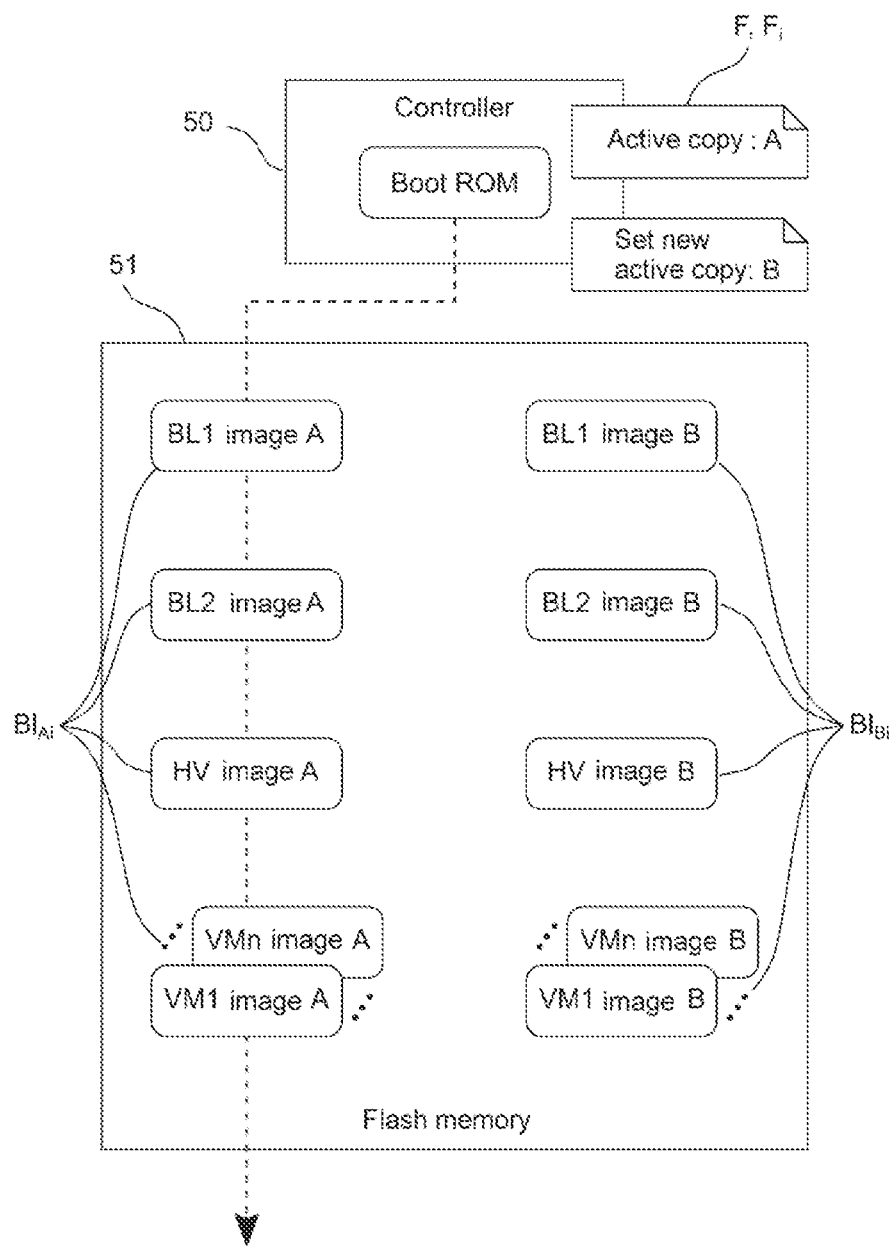
FIG. 7 shows schematically a multi-stage boot sequence according to the invention when no corrupted boot image is present.
Figure 8:
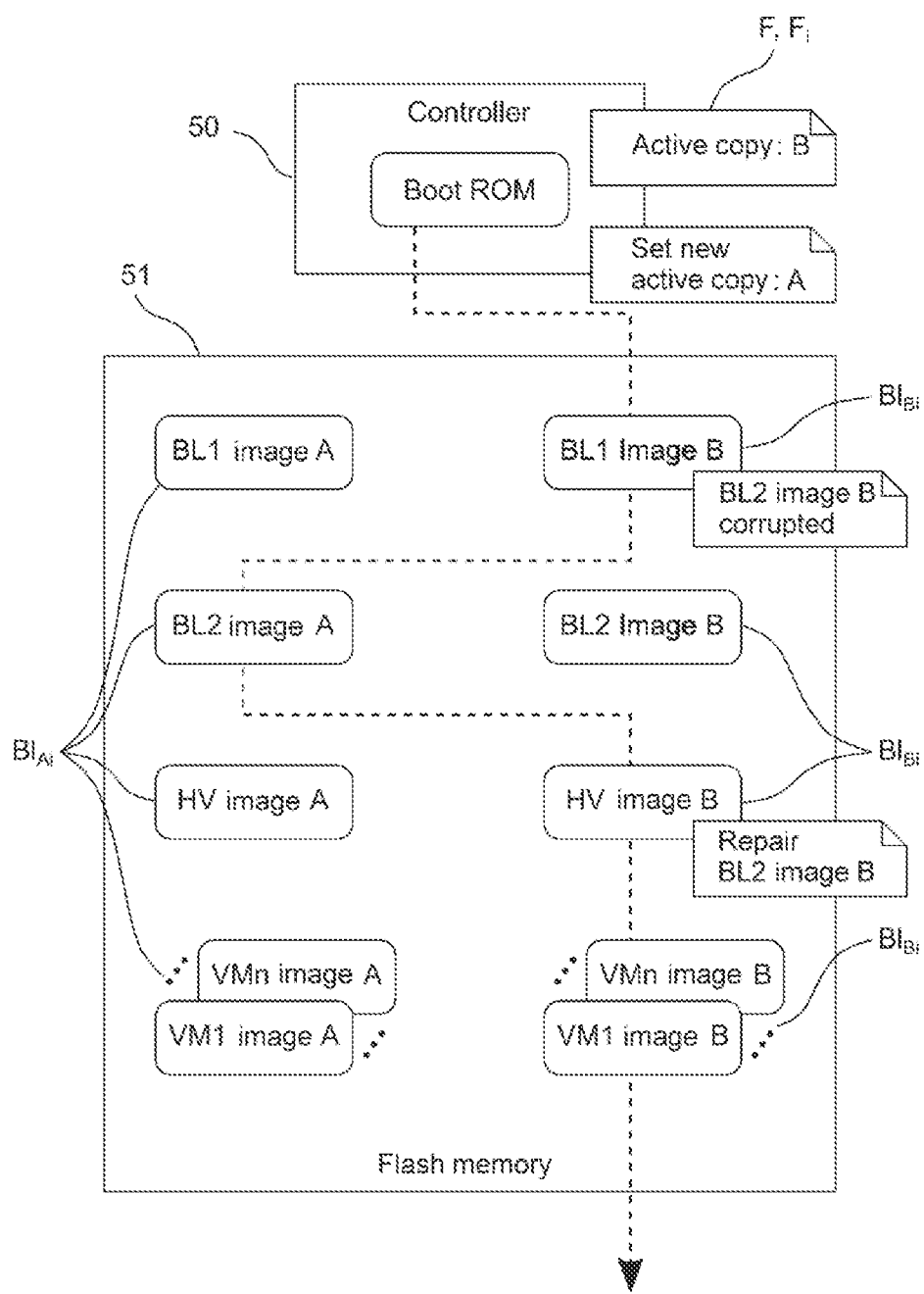
FIG. 8 shows schematically a multi-stage boot sequence according to the invention after a changeover of the active copy when a corrupted boot image is present.

FIG. 7 shows schematically a multi-stage boot sequence according to the invention when no corrupted boot image $BI_{Ai}$, $BI_{Bi}$ is present. In the solution according to the invention, after every boot process, or at least after a defined number of boot processes, another copy of a boot image $BI_{Ai}$, $BI_{Bi}$ is set as the active copy for the next boot process. This can be done simply by setting the global flag F, or the individual flags $F_i$, to a new value. During the next boot process, the other copies of the boot images $BI_{Ai}$, $BI_{Bi}$ are then accessed, with the result that these are now checked and, if necessary, repaired. This is illustrated by way of example in FIG. 8.

The invention claimed is:

1. A method for performing a boot process for a system that supports redundant copies of boot images ($BI_{Ai}$, $BI_{Bi}$), having the steps:
    determining an active copy of the boot images ($BI_{Ai}$, $BI_{Bi}$);
    processing the active copy of the boot images ($BI_{Ai}$, $BI_{Bi}$);
    setting another copy of the boot images ($BI_{Ai}$, $BI_{Bi}$) as the active copy for a subsequent boot process in response to a successful boot process;
    causing a previous boot-process stage to ascertain corruption of an active copy of a current-boot-process-stage boot image during the boot process;
    processing a corresponding redundant copy of the corrupted active copy of the current-boot-process-stage boot image to be executed as the current-boot-process-stage boot image during the boot process; and
    processing, in a next boot-process stage following the current-boot-process stage, an active copy of a next-boot-process-stage boot image to complete the boot process as the successful boot process including repairing the corrupted active copy of the current-boot-process-stage boot image via a hypervisor stage replacing the corrupted active copy of the current-boot-process-stage boot image with the corresponding redundant copy.

2. The method as claimed in claim 1, wherein at least one flag (F, $F_i$) is used to indicate the active copy of the boot images ($BI_{Ai}$, $BI_{Bi}$).

3. The method as claimed in claim 2, wherein the at least one flag (F, $F_i$) is stored in a memory of the system or is provided by an external unit.

4. The method as claimed in claim 3, wherein the at least one flag (F, $F_i$) is set for individual stages of a boot sequence or globally for the boot sequence.

5. The method as claimed in claim 1, wherein redundant copies of the boot images ($BI_{Ai}$, $BI_{Bi}$) are available only for individual stages of a boot sequence.

6. The method as claimed in claim 5, wherein, in response to an update process for a loadable software component or a loadable firmware component, delaying a subsequent boot process until successful completion of the update process.

7. An apparatus for performing a boot process for a system that supports redundant copies of boot images ($BI_{Ai}$, $BI_{Bi}$), having:
   an analysis unit for determining an active copy of the boot images ($BI_{Ai}$, $BI_{Bi}$);
   a processing unit for:
      processing the active copy of the boot images ($BI_{Ai}$, $BI_{Bi}$),
      setting another copy of the boot images ($BI_{Ai}$, $BI_{Bi}$) as the active copy for a subsequent boot process in response to a successful boot process,
      causing a previous boot-process stage to ascertain corruption of an active copy of a current-boot-process-stage boot image during the process,
      processing a corresponding redundant copy of the corrupted active copy of the current-boot-process-stage boot image to be executed as the current-boot-process-stage boot image during the boot process, and
      processing, in a next boot-process stage following the current-boot-process stage, an active copy of a next-boot-process-stage boot image to complete the boot process as the successful boot process including repairing the corrupted active copy of the current-boot-process-stage boot image via a hypervisor stage replacing the corrupted active copy of the current-boot-process-stage boot image with the corresponding redundant copy.

8. A non-transitory computer-readable medium having stored there on a computer program containing instructions that, when executed by a computer, cause the computer to perform a boot process for a system that supports redundant copies of boot images ($BI_{Ai}$, $BI_{Bi}$), the boot process having operations comprising:
   determining an active copy of the boot images ($BI_{Ai}$, $BI_{Bi}$);
   processing the active copy of the boot images ($BI_{Ai}$, $BI_{Bi}$);
   setting another copy of the boot images ($BI_{Ai}$, $BI_{Bi}$) as the active copy for a subsequent boot process in response to a successful boot process;
   causing a previous boot-process stage to ascertain corruption of an active copy of a current-boot-process-stage boot image during the boot process;
   processing a corresponding redundant copy of the corrupted active copy of the current-boot-process-stage boot image is processed to be executed as the current-boot-process-stage boot image during the boot process; and
   processing, in a next boot-process stage following the current-boot-process stage, an active copy of a next-boot-process-stage boot image to complete the boot process as the successful boot process including repairing the corrupted active copy of the current-boot-process-stage boot image via a hypervisor stage replacing the corrupted active copy of the current-boot-process-stage boot image with the corresponding redundant copy.

9. The non-transitory computer-readable medium as claimed in claim 8, wherein redundant copies of the boot images ($BI_{Ai}$, $BI_{Bi}$) are available only for individual stages of a boot sequence.

10. The non-transitory computer-readable medium as claimed in claim 9, wherein, in response to an update process for a loadable software component or a loadable firmware component, delaying a subsequent boot process until successful completion of the update process.

11. The non-transitory computer-readable medium as claimed in claim 8, wherein at least one flag (F, $F_i$) is used to indicate the active copy of the boot images ($BI_{Ai}$, $BI_{Bi}$).

12. The non-transitory computer-readable medium as claimed in claim 11, wherein the at least one flag (F, $F_i$) is stored in a memory of the system or is provided by an external unit.

13. The non-transitory computer-readable medium as claimed in claim 12, wherein the at least one flag (F, $F_i$) is set for individual stages of a boot sequence or globally for the boot sequence.

* * * * *